J. O'LEARY.
VEHICLE FENDER.
APPLICATION FILED JULY 22, 1914.
1,126,558.
Patented Jan. 26, 1915.
2 SHEETS—SHEET 1.
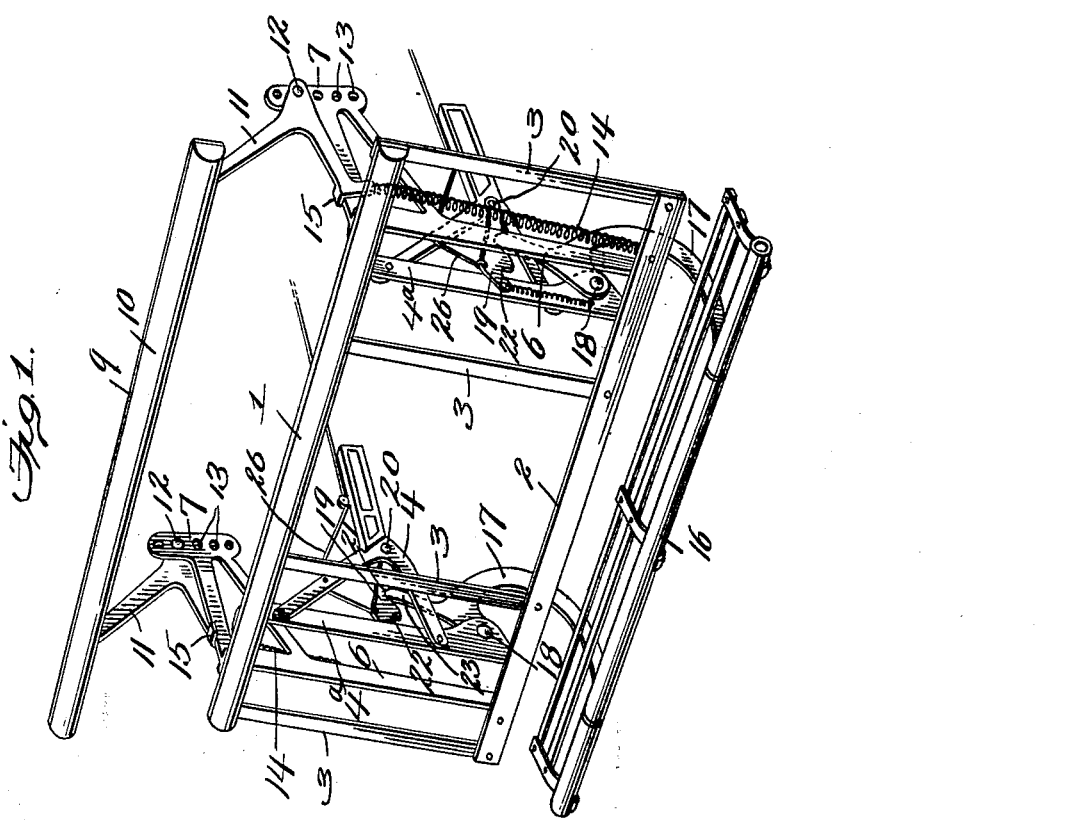
Witnesses:
Inventor
John O'Leary
by
Attorney J. O'LEARY.
VEHICLE FENDER.
APPLICATION FILED JULY 22, 1914.
1,126,558.
Patented Jan. 26, 1915.
2 SHEETS—SHEET 2.
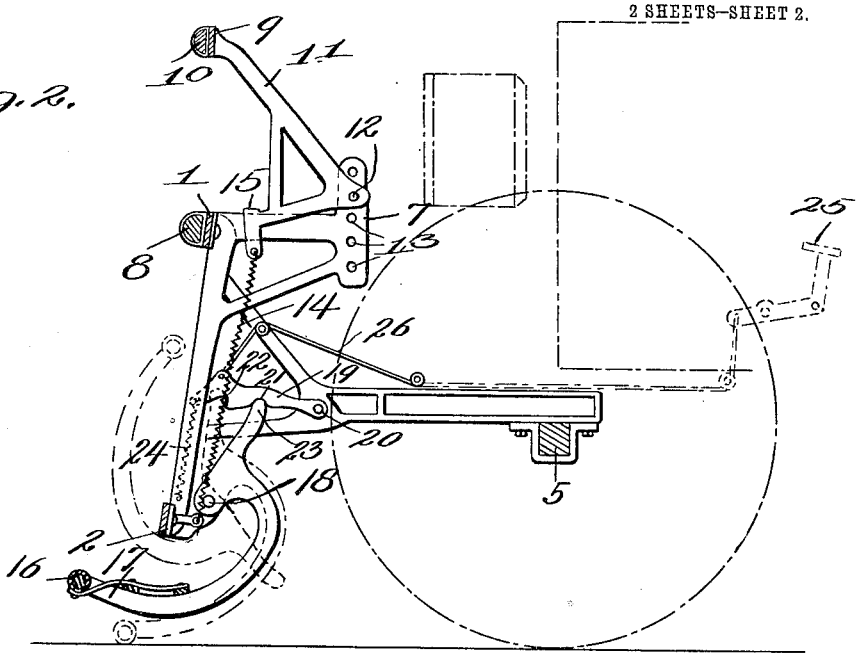
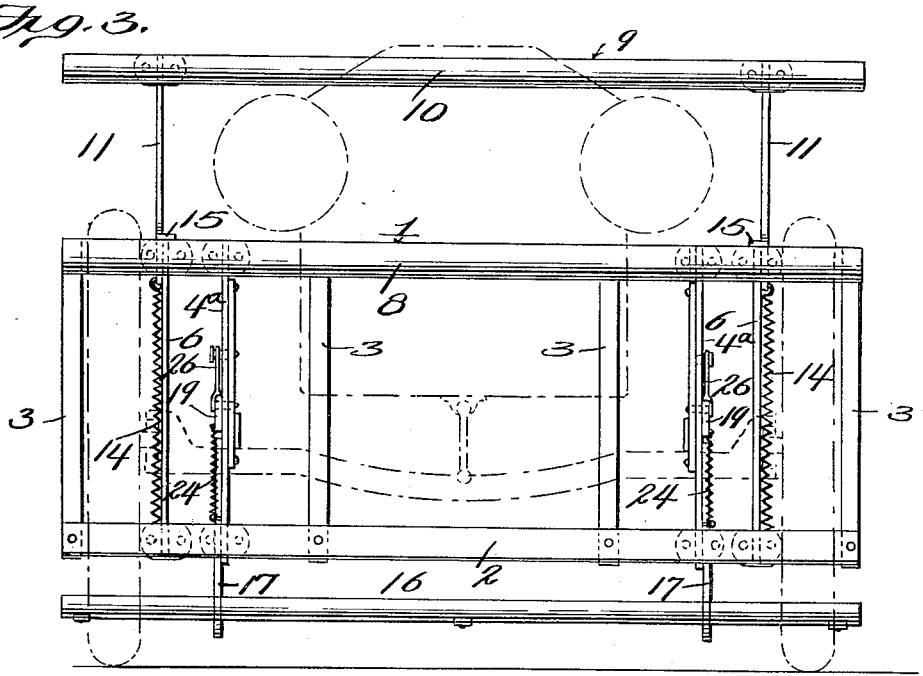
Witnesses:
Inventor
John O'Leary
by James L. Norris,
Attorney

UNITED STATES PATENT OFFICE.

JOHN O'LEARY, OF COHOES, NEW YORK.

VEHICLE-FENDER.

1,126,558.

Specification of Letters Patent.

Patented Jan. 26, 1915.

Application filed July 22, 1914. Serial No. 852,461.

*To all whom it may concern:*

Be it known that I, JOHN O'LEARY, a citizen of the United States, residing at Cohoes, in the county of Albany and State of New York, have invented new and useful Improvements in Vehicle-Fenders, of which the following is a specification.

My present invention relates to improvements in fenders for vehicles and more particularly automobiles, and the primary objects of the invention are to provide a fender which will protect and avoid injury to the head of a person standing when struck by the automobile and which will prevent passing of either of the wheels over a person, the latter feature involving a wheel guard which is normally held by a latch in position in readiness for operation and is tripped to allow it to drop either automatically, upon encountering the body of a person, or manually by the operator in the seat of the vehicle, and in which the latch, when the guard has been tripped and has been dropped, acts automatically to hold the guard in depressed position to prevent it from rising, thus avoiding passing of the guard over the body, the wheel guard being also constructed in a manner that will permit it to be readily lifted into an inoperative position when desired.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a perspective view of a fender constructed in accordance with the present invention, the fender being especially adapted for use upon automobiles; Fig. 2 is a side elevation of the fender, showing the same applied to the front of an automobile, the wheel guard being shown in normal position by the full lines and in operative and inoperative positions respectively by the dotted lines; Fig. 3 is a front elevation of the fender as applied to an automobile; and Fig. 4 is a detail perspective view showing the latch for the wheel guard.

Similar parts are designated by the same reference characters in the several views.

The preferred form of the invention is shown in the accompanying drawings and will be hereinafter described in detail. It will be understood, however, that the invention is not restricted to the precise construction shown, as equivalent constructions within the scope of the annexed claims are contemplated.

In the construction shown, the fender comprises a main or body section composed of the upper and lower horizontal rails 1 and 2, the vertical rods 3 connecting the upper and lower rails, the brackets 4 which are preferably forked, as shown, and secured at their forward ends to the body section of the fender and at their rear ends to the front axle 5 of the automobile, and uprights 6 connect the upper and lower rails 1 and 2 and are provided at their upper ends and in rear of the upper rail 1 with brackets 7. The frame of the main or body section of the fender may be covered with wire mesh or the like, and the upper rail 1 is preferably provided with a padding 8, as shown.

The present invention provides a guard or shield which will prevent injury to the head of a person struck by the automobile when such person is in a standing position, this guard or shield being positioned in front of the radiator or hood and lamps of the automobile so that it, upon encountering the head of a person, will yield rearwardly, thereby minimizing the shock incident to the contact or collision. In the construction shown, this guard or shield comprises a rail 9 which is preferably provided at its forward side with padding 10, as shown, and a pair of supporting arms 11, preferably in the form substantially of bell-cranks, which are fixed to the rail 9 near its ends. The rear portions of the supporting arms 11 are pivotally connected to the brackets 7 on the main section of the fender by pivot pins 12 which are adapted to be inserted in one of a plurality of apertures 13 formed in each of the brackets 7, it being preferable to provide a series of vertically spaced apertures 13 in the brackets in order that the height of the shield or guard may be adjusted to conform to requirements in installing the fender upon different automobiles. Springs 14 are attached to the arms 11 and act to hold the shield or guard in a forward position and permit the shield or guard to yield rearwardly when the same encounters the head of a person. In order to set the shield or guard properly in normal position, stops 15 are formed on the supporting arms 11 and are adapted to abut against the upper sides of the brackets 7, thus resisting the tendency of the springs 14 to swing the shield or guard farther forward and permitting the shield or guard to yield rearwardly. The guard or shield to protect the head of a person occupies a position in front of the radiator or hood and the lamps of the automobile and prevents injury to the head of a person struck by the automobile from contact with such parts. The shield or guard, however, is so constructed that it does not interfere with these parts as usually located upon an automobile.

That section of the fender which I term a "wheel guard" to prevent passage of both wheels of the automobile over the body of a person is located beneath the main section of the fender. It comprises, in the construction shown, a horizontal rail 16 which is adapted to encounter the body of the person and a pair of arms 17 which guide and support the rail. The arms 17 are pivoted preferably at the rear of the lower rail 2; they being shown pivoted to vertical bars 4ª attached to the brackets 4 at the points 18 in the present instance, and these arms 17 are curved in a manner that will permit the rail 16 to be lifted into an inoperative position in front of the main or body section of the fender when desired, the wheel guard being shown in this position by the dotted lines in Fig. 2. Normally, the wheel guard occupies the position shown by the full lines in Fig. 2, it resting at a suitable distance above the ground so as to avoid contact therewith during movement of the automobile, and the present invention provides a latch to retain the wheel guard in this normal position but which will permit the wheel guard to drop to the ground before the wheels, either by the pressure of the body of a person against the rail 16, or manually, by the operator of the vehicle. In the construction shown, a pair of latches 19 are employed which are pivoted at 20 to the main portions of the brackets 4, and each latch has a pair of notches 21 and 22 to coöperate with a retaining projection 23 on the respective arm 17, the projections 23 engaging in the notches 21 of the latches when the wheel guard is in normal position and engaging in the notches 22 when the wheel guard is depressed. The shape of the notch 21 and the relation between the latches and the projections 23 is such that rearward pressure upon the rail 16 of the wheel guard will disengage the projections 23 from the notches 21 and cause the projections 23 to enter the notches 22 as the wheel guard drops. The latches are yieldably held in coöperative relation with the retaining projections 23 of the wheel guard by springs 24. When the wheel guard is depressed, the engagement of the projections 23 in the notches 22 serves to lock the wheel guard in depressed position, thereby preventing it from becoming lifted and allowing the body of the person to pass beneath the wheels. Instead of depending upon automatic depression of the wheel guard when the same encounters the body of a person, the operator may cause the wheel guard to drop by depressing a pedal or equivalent device 25 located within convenient reach of the operator in the seat of the vehicle, this pedal being connected to the latches by cords or cables 26 which cause the latches to be lifted and thereby disengaged from the retaining projections 23 of the wheel guard, when gravity of the latter will cause it to drop. Release of pressure upon the pedal 25 will allow the latches to drop under the action of the springs 24, thereby engaging the retaining projections 23 in the notches 22 and thus holding the wheel guard in depressed position.

I claim as my invention:—

1. A vehicle fender comprising an upright relatively fixed main or body section, a head rail extending horizontally above the main or body section, brackets attached to said rail and having their rear portions pivoted whereby the rail may move rearwardly, said brackets being provided at their forward portions with means for positioning the rail in normal position, and springs connected to said brackets and operative to yieldingly retain the rail in its normal forward position.

2. A vehicle fender comprising a main or body section, and a head guard located above the same and having a spring yieldably holding the guard in normal forward position, and stops for setting the guard in its normal forward position.

3. A vehicle fender comprising a main or body section, and a head guard pivotally mounted above said section and yieldable rearwardly relatively thereto, the pivots for the guard being adjustable vertically to vary the position of the guard relatively to the body section.

4. A vehicle fender comprising a body section having means for attaching it to a vehicle, and a wheel guard pivotally mounted beneath the same and capable of occupying a normal operative position below said section or in folded relation flatwise against the front of said body section, and a latch for holding the guard in normal position and active automatically to permit dropping of the guard.

5. A vehicle fender comprising a main or body section, a wheel guard located beneath the same and movable in a direction rearwardly and downwardly, and a latch for holding said guard in normal position and releasable automatically by pressure rearwardly on said guard to permit dropping of the latter.

6. A vehicle fender comprising a main or body section, a wheel guard located beneath the same and having a retaining projection, and a notched latch coöperative with said projection for holding said guard in normal position and releasable manually to permit dropping of the latter.

7. A vehicle fender comprising a main or body section, a wheel guard located beneath the same and movable rearwardly and downwardly, and a latch for holding said guard in normal position and releasable automatically by rearward pressure on said guard and also manually to permit dropping of the guard.

8. A vehicle fender comprising a main or body section, a wheel guard located beneath the same, and an automatically tripped latch normally supporting the guard in elevated position and operative automatically to lock the guard from rising when in depressed position.

9. A vehicle fender comprising a main or body section, a wheel guard located beneath the same, and a latch for retaining said guard in normal position and operative to lock the guard against upward movement when in depressed position.

In testimony whereof I have hereunto set my hand in presence of two subscribing witnesses.

JOHN O'LEARY.

Witnesses:
 DAVID I. DONOVAN,
 WILLIAM MABY.

Copies of this patent may be obtained for five cents each, by addressing the "Commissioner of Patents, Washington, D. C."